United States Patent [19]
Scharfmann et al.

[11] Patent Number: 5,795,613
[45] Date of Patent: Aug. 18, 1998

[54] DRIED CHEESE PIECES OF NONMELTING CHEESE AND PROCESS OF MAKING THE SAME

[75] Inventors: Paul Scharfmann, Madison; Ludwig Zoller, Watertown, both of Wis.

[73] Assignee: Specialty Cheese Company, Inc., Lowell, Wis.

[21] Appl. No.: 641,482

[22] Filed: May 1, 1996

Related U.S. Application Data

[63] Continuation-in-part of Ser. No. 373,952, Jan. 17, 1995, abandoned.

[51] Int. Cl.⁶ ..................................... A23C 19/086
[52] U.S. Cl. .................... 426/582; 426/237; 426/242; 426/443; 426/445; 426/456; 426/514; 426/515; 426/583; 426/654
[58] Field of Search .................... 426/237, 242, 426/443, 445, 456, 582, 654, 514, 515, 583

[56] References Cited

U.S. PATENT DOCUMENTS

| | | |
|---|---|---|
| 1,689,357 | 10/1928 | Merrell . |
| 2,572,765 | 10/1951 | Ruys ........................... 426/582 |
| 3,190,760 | 6/1965 | Morgan . |
| 3,573,930 | 4/1971 | Dale ........................... 426/582 |
| 3,573,931 | 4/1971 | Dale . |
| 3,600,193 | 8/1971 | Glabe et al. . |
| 4,719,118 | 1/1988 | Thomas . |
| 4,803,090 | 2/1989 | Schlpalius ...................... 426/582 |
| 4,885,183 | 12/1989 | Strandholm et al. ............... 426/582 |
| 4,940,600 | 7/1990 | Yokoyama et al. ................ 426/582 |
| 5,165,948 | 11/1992 | Thomas .......................... 426/242 |

FOREIGN PATENT DOCUMENTS

| | | |
|---|---|---|
| 0174846 | 3/1986 | European Pat. Off. . |
| 2039849 | 2/1990 | Japan ............................ 426/242 |

OTHER PUBLICATIONS

Webster's Ninth New Collegiate Dictionary, Merriam-Webster, Inc., Springfield, MS, p. 302.

*Primary Examiner*—Helen Pratt
*Attorney, Agent, or Firm*—Peterson, Wicks, Nemer & Kamrath, P.A.

[57] ABSTRACT

A dried crisp cheese piece is disclosed in a first preferred form including a nonmelting cheese dried to its final moisture content by microwave energy. The nonmelting cheese generally includes a pH of greater than about 5.7. The final moisture content of the dried cheese piece is preferably between 2 and 8% by weight. The final dried cheese piece is unpuffed and requires no refrigeration. A process for making the dried cheese piece is also disclosed. The process essentially includes subjecting the nonmelting cheese having particular thickness dimensions to microwave energy to reduce the cheese piece from an initial moisture content to a final moisture content ranging from about 2% to 8%. The drying step can be practiced using forming pans to obtain finished products having various three dimensional shapes and configurations.

40 Claims, 1 Drawing Sheet

DRIED CHEESE PIECES OF NONMELTING CHEESE AND PROCESS OF MAKING THE SAME

CROSS REFERENCE TO RELATED APPLICATION

This application is a Continuation-In-Part, now abandoned application to U.S. Ser. No. 08/373,952 filed Jan. 17, 1995.

BACKGROUND

1. Field of the Invention

The present invention relates generally to food dairy products, particularly to cheese products, and specifically to a snack food in the form of a dried cheese piece of a nonmelting cheese and to a process for making the dried cheese piece.

2. Background

Cheese is a milk-based product. One conventional way to form a dried milk-based product is to, prior to drying, mix with milk a large portion (30% or more by weight) of a farinaceous material or other binder. Another way to form dried milk pieces, without the use of a binder, is to dry a water and powdered milk slurry using thermal energy. A cheese and water slurry may be dried using either radiant heat or hot oil. These processes for drying milk-based products may involve the spreading of a thin layer of a water mixture in a warm environment. This has high potential for the growth of pathogenic bacteria (e.g. Listeria) which multiply rapidly in a moist, nutrient-dense environment where the temperature is less than 140° F. (60.0° C. ).

Cheese products may be dried by a number of methods, including freeze drying, thermal drying, spray drying, or by being heated in hot oil. While some of these methods may avoid a water mixture step, they remain problematic.

For example, freeze drying is prohibitively expensive in commercial practice. Further, thin pieces of cheese when freeze dried lack structural integrity to survive commercial distribution and still be sufficiently large to be individual, hand-held pieces. Conversely, thicker pieces of cheese when freeze dried generally retain too much moisture to be crisp. Moreover, freeze dried thicker pieces of cheese that will remain intact through commercial distribution are too thick to be easily chewed by the consumer.

Spray drying of cheese can be accomplished by admixing cheese with skim milk, phosphates and the like, followed by spraying the mixture. This will, however, produce very small pieces of cheese-usually a cheese powder, not pieces of crisp cheese of sufficient size to be consumed as snack pieces.

Thermal heating of cheese can dry cheese if the temperature of heating is kept well below the melting point of the cheese and the cheese is held at such a temperature for more than two hours. This process may be both time consuming and energy intensive.

Hot oil heated to 300° F. (148.8° C. ) is another means used to dry cheese. Such a means, though, often results in the cheese melting and losing its shape. Additionally, some of these forms of drying, such as thermal drying with hot air or oil or vacuum drying, can create a dry crust on the outside of the cheese piece. The dry crust then prevents moisture from escaping from the interior of the piece. It should be noted that, relative to other milk-based products, cheese products may be preferable. For example, a cheese snack may taste better than a dried milk snack because the cheese culture modifies the triglycerides to create flavorful free fatty acids and because the salt in cheese enhances flavor.

It is known to treat pieces of a meltable cheese with thermal predrying and with final microwave heating to create a puffed dried cheese piece (see U.S. Pat. No. 4,803,090 entitled "Process for Producing a Microwave Puffed Cheese Snack" issued Feb. 7, 1989 to Schlipalius et al.). However, the method therein disclosed employs a meltable cheese rather than a nonmelting cheese. The finished product obtained by practicing this method can be characterized as amorphous in shape having been in a puffed or leavened molten state during processing and having a puffed crunchy texture. The '090 patent does not teach methods for producing a finished dried cheese piece product having a dimensional configuration substantially similar to the initial cheese pieces from which the finished product is prepared.

SUMMARY

Accordingly, general objects of the invention are to provide a unique crisp dried cheese piece made almost exclusively of cheese and a unique, simple process for making the dried cheese piece.

Another object of the invention is to provide a unique dried cheese piece made from nonmelting cheese. Specifically, a nonmelting cheese may be defined as a cheese whose base area increases by less than 20% when cut into a cube of one-half inch (1.27 cm) per side and placed for five minutes in a oven preheated to 350° F. (176.7° C. ). Such a cheese may be a natural cheese with a pH above 5.7, a lower pH cheese that does not melt, or a cheese mixed with an inorganic phosphate melt inhibiting ingredient such as orthophosphate materials including tetrasodium pyrophosphate, sodium acid pyrophosphate, sodium hexametaphosphate, and mixtures thereof, or polyphosphates. A nonmelting cheese permits a relatively great amount of heat to be used for drying the cheese, results in a unique texture after drying, retains its shape during drying, and permits shaping during drying into three dimensional shapes or configurations.

Another object of the invention is to provide a unique process for making a dried cheese piece by using radiation energy such as microwave waves and radio waves. Dielectric heating is uniquely suited to vaporize the internal moisture of cheese without forming a hard crust exterior. Dielectric heating moreover is able to drive out residual moisture without unduly caramelizing the milk sugar or creating burned flavors or colors.

Another object of the present invention is to provide methods for preparing a dried cheese product with minimal fat loss ("oiling off") and to finished products prepared thereby. The present methods create a microstructure in the dried cheese with such tiny holes that the water vapor can slowly be vented but the fats are essentially unable to leave the protein matrix whereby oiling off or loss of the fat component is minimized.

Another object of the invention is to provide a process for making a dried cheese piece that uses a nonmelting cheese with a unique initial moisture content of no greater than about 46% by weight. A high moisture content causes the cheese to acquire a burned flavor before the cheese is fully dried. Also, having a higher initial moisture content can undesirably tend to foster the development of large brown or even blackened areas in the finished product.

Another object of the invention is to provide a nonmelting dried cheese piece with a unique moisture content of from about 2% to about 8% by weight. This preferred range provides a dried cheese piece which is crisp yet retains its structural integrity for shipping such that it can be delivered to the consumer in a sufficiently large one-piece hand-held form.

Another object of the invention is to provide a process for making a nonmelting dried cheese piece wherein the cheese is uniquely sliced to a thickness of between about 1/32 inch (0.76 mm) and about 1/4 inch (6 mm.). Such is sufficiently thin to permit moisture to be driven out of the cheese relatively rapidly, but is sufficiently thick so that the dried cheese piece retains structural integrity.

Another object of the invention is to provide a nonmelting dried cheese piece which uniquely requires no refrigeration. This saves on shipping and storage costs as such permits the dried cheese piece to be kept in places where refrigeration may be neither available nor economical. A cheese snack requiring no refrigeration is also convenient for the consumer who is still provided with most, if not all, of the nutrition of the original natural or processed cheese.

Another object of the invention is to provide a nonmelting dried cheese piece which is uniquely nonpuffed. A more natural cheese feel, both to the hand and in the mouth, is therefore presented to the consumer. It should be noted here that, with the present process, the cheese may blister somewhat and thus at times-may have a slight appearance of being puffed. However, this blistering may be caused simply by driving moisture from the cheese, not by pressure differentials found in the conventional puffing process.

Another object of the invention is to provide methods and finished products produced therefrom which retain the shape of the pieces during processing so as to realize finished products having substantially the same shape and configuration of the cheese pieces from which they are fabricated or assume the shape of objects or molds over which the slices are draped or supported during drying.

Surprisingly, all of the above objectives can be satisfied in the food product field by the preferred teachings of the present invention, detailed descriptions of which are provided below.

DESCRIPTION

The process of the invention generally includes the steps of providing a nonmelting cheese, slicing the nonmelting cheese, and drying the nonmelting cheese.

The step of providing a nonmelting cheese includes making or selecting a cheese that does not melt. As used herein, a "nonmelting" cheese is meant a cheese whose base area increases by less than 20% (less than 0.3 square inches (1.94 cm$^2$)) when cut into a cube of one-half inch (1.27 cm) per side and placed for five minutes in an oven preheated to 350° F. (176.7° C.). Thus, such a nonmelting cheese has a "melt value" (i.e., a ratio of surface area after heating divided by initial surface area) of less than 1.20. Even more preferred for use herein are nonmelting cheeses having melt values of about 1.0 to 1.1.

selecting a nonmelting cheese is important to the realization of the desirable textural features of the finished dried cheese product herein. Also, selecting a nonmelting cheese is important to obtaining a finished final product having the desirable finished shape attributed herein. Selecting a non-melting cheese is further important to maintaining straight side edges during the drying step and that can be used to form finished pieces having straight side edges having vertical faces that are perpendicular to the top and bottom major flat faces.

Cheese making is a well developed art and the skilled artisan will have no difficulty making a nonmelting cheese having the particular selected features required for use herein. Generally however, useful nonmelting cheese will be either natural cheese having suitable nonmelting characteristics or, less preferably, processed cheese products that are nonmelting.

A nonmelting cheese can be prepared by making certain natural cheeses with a pH above about 5.7, by making a lower pH natural cheese that does not melt, or by making a processed cheese that essentially includes a melt inhibiting inorganic mixing ingredient such as a orthophosphate or polyphosphate. Suitable for use herein and permitted for use in cheese in the U.S. as the inorganic phosphate are orthophosphate materials such as tetrasodium pyrophosphate, sodium acid pyrophosphate, sodium hexametaphosphate, and mixtures thereof.

A "natural" cheese is to be distinguished from a processed cheese. Natural cheese is a protein based matrix formed by trapping milkfat between linked protein micelles. Protein micelles are the fraction of the protein casein that are left after the coagulant (rennet/chymosin) has separated the kappa-casein from the rest of the casein molecule. These protein micelles have a negative ionic charge. In a natural cheese of pH. 5.7 or higher, the protein micelles are held in a rigid structure by positively charged calcium ions that associate between them. The milkfat and water are trapped in this rigid matrix caused by the attraction between the opposing charges of the protein micelles and the calcium ions.

A processed cheese is a cheese product that results from mixing cheese ingredients such as commuted cheeses of one or more types, blending the cheese(s) and cheese and/or milk derived materials together with emulsifiers and stabilizers, gums, caseinates, or other ingredients with the aid of mixing and heat to form an homogeneous blend and forming the blend into bricks, slices or otherwise packaging the product.

In contrast, a natural cheese is one that has not been so processed. Rather, the milk, optionally flavored with-desired spices, is treated to form a cheese. Such natural cheeses then are desirably free (i.e., contain less than 0.5%) of any emulsifiers, gums, starches, added caseinates or heat coagu-able materials such as egg white, starch, soy protein, or other ingredients not supplied in the starting milk material that a processed cheese product might contain.

Moreover, processed cheeses are generally formulated and prepared especially to have good melt characteristics. Conventional, typical processed cheeses are generally easily meltable and assume a smooth fluid form at low temperatures (~150° F., 65° C.). A processed cheese is a cross linked protein matrix but not one that is a naturally formed matrix of proteins. For common processed cheese, (e g., "American, cheese sauces, etc.), emulsifying salts are used that release their bonds at relatively low temperatures. For example, an "American" cheese melts easily at low temperatures (~150° F., 65° C.) and cheese sauces are not solid at room temperature. Most processed cheeses thus have emulsifiers added to increase their meltability.

It is believed herein that as the pH of a natural cheese is lowered, the calcium ions tend to go into solution and are no longer associated with the casein. Consequently, with fewer linkages between the protein micelles, the structure of the cheese weakens and thus melts more easily. While not wishing to be bound herein to the proposed theory, to insure sufficient strength to be nonmelting, preferred for use herein are nonmelting natural cheeses having a pH of about 5.7 to about 6.4, more preferably about 6.0 to about 6.3, and for best results about 6.1 to about 6.2.

In the case of natural nonmelting cheese, it is also preferred that the cheese have had minimal proteolysis of its casein. A cheese whose Beta casein fraction includes minimal proteolysis may be more preferable. These cheeses may be made by using either direct vat acidification or by using a cheese culture whose growth can be arrested before the pH of the cheese is lowered below about 5.7.

Even more preferred are fresh, high pH (5.7 or more) cheeses that have been pressed to 36–43% moisture levels. Lower moisture cheese are preferred primarily since such cheeses are easier to dry without browning or burning the slices. Such fresh cheeses include Queso Blanco, Ackawi (especially pressed Ackawi), Queso Fresco (especially pressed Queso Fresco), Panela (especially pressed Panela), Queso Para Freir (especially pressed Queso Para Freir), Paneer (especially pressed Paneer), and other ethnic fresh cheeses. Most preferred are these fresh cheeses when their moisture has been reduced to 39–41% and they are made using whole milk (3.7% or more of butterfat) and 3.1% or more of protein. Low fat versions of these cheeses can also be used, but are less preferred, by removing fat from the milk in the make process to obtain 1.0–2.0% butterfat milk.

Certain cheeses including some that are commercially available that are unsuitable for use herein by virtue of excessive moisture content but which otherwise are suitable can be made useful herein by simple pressing to remove excessive incorporated moisture. However, special care should be taken to ensure that the pressing step does not create any internal or external cracks, crevices, mechanical openings or other imperfections, or create a crumbly cheese that will not slice smoothly.

The melt resistance characteristics of a cheese can also be influenced by increasing the amount of denatured whey protein contained therein. Pasteurizing the cheese milk at temperatures higher than 175° F. tends to denature the whey protein. As more denatured whey protein is incorporated into the cheese matrix, the matrix is strengthened. The matrix strengthening is independent of pH thus allowing for use of lower pH cheeses such as Indian Paneer cheese. Preferably, at least 10% of the whey proteins are denatured in the starting cheese. For better results, about 10% to 50% of the whey proteins present is denatured. Excessive whey protein denaturation, however, is undesirable since the cheese tends to be crumbly. Crumbly cheese is difficult to slice without having cracks or mechanical openings in the slices.

As noted above, less preferred for use herein are particular nonmelting processed cheese. By virtue of their methods of preparation, the native protein matrix structure of a natural cheese is disrupted by the grinding or blending steps typically used to prepare the cheese ingredient used in a processed cheese product. However, it is possible to add to the processed cheese formulation materials that inhibit the melting of the cheese product. Typically, these melt inhibiting materials are the inorganic phosphate materials described above.

The amount of melt inhibiting materials preferred is about 0.5% to about 3% by weight based on the amount of dry cheese solids. It should be noted that the amount of melt inhibiting materials may depend upon the type of cheese with which it is mixed. In the case of a cheese mixed with a melt inhibiting material(s) to produce a cheese that does not melt, a natural cheese or a processed cheese, or mixtures of natural and processed cheese, may be used. The melt inhibiting material(s) are incorporated into the cheese in a water solution which is mixed at an elevated temperature sufficient to melt the cheese.

Flavorings, colorings, inlays, vitamins, and minerals may be added to the cheese during the make process of the cheese. Inlays may include vegetable, fruit, or dried meat inlays. These additives may be incorporated into the cheese, such as during the make process, or onto the cheese slices, such as prior to the slices being dried.

It is preferred that the cheese, whether natural or processed cheese or a mixture thereof, be prepared with a moisture content not to exceed about 46% by weight. For the purposes of this invention, such a moisture content may be referred to as an initial moisture content or as a natural initial moisture content. Preferably, such a moisture content lies in the range of about 30% to 46% by weight. A range of about 36% to about 43% by weight is even more preferred. A range of about 39% to about 41% by weight is most preferred.

The desired initial moisture content can be controlled by pressing the cheese, whether natural or processed or a mixture thereof, in a conventional cheese press. In the case of a processed cheese, the initial moisture content can further be controlled by limiting the amount of water added to the cheese mixture.

After the cheese making process, the cheese is sliced. This includes slicing the cheese into pieces preferably no thinner than about ¹⁄₃₂ inch (~0.8 mm) and no thicker than about ¼ inch (~6 mm). An even more preferred range is from about ¹⁄₁₆ inch (~1.6 mm) to about ¼ inch (~6.4 mm). The most preferred range is from about ³⁄₃₂ (~2.38 mm) to about ⅛ inch (~3.2 mm). The desired thickness may depend upon the type of cheese and the amount of fat and moisture in the cheese as well as the desired configuration of the slice of dried cheese.

It is preferred that the piece be of a sufficient size to be hand-held. The surface area of one face of a piece may be as large as 25 square inches (161 cm$^2$) or as small as ¼ inch (0.64 cm) in at least one direction.

The shape of a piece may be circular, square, a parallelogram, rectangular or of any other shape, including an irregular shape. The piece preferably includes opposing generally major sides so as to be formed in the shape of a cracker. The term "cracker" is used herein in its common older usage to refer to a food item in the form of a thin crisp wafer and not used to indicate that the product is a baked flour based product.

Importantly, the sliced cheese pieces are continuous, i.e., have minimal cracks or mechanical openings both internally and externally. Such fractures tend to form deformities in the finished products rendering them too fragile to handle. Specifically, it is believed that such fractures will become greatly expanded as steam is released into them and can expand during drying.

After the cheese has been sliced, the pieces of cheese are dried from their initial or native moisture content to their finished or dried moisture content. Preferably the pieces are dried at atmospheric pressure exclusively with dielectric heating such as with microwave or radio wave frequency to their final moisture content. Such exclusive dielectric heating to dry the cheese slices reduces the chance of undesirably creating an exterior dry crust. Moreover, in an embodiment of the present invention used to fabricate pieces having a complex three-dimensional shape, exclusive usage of dielectric drying facilitates production of such complex shapes.

The cheese pieces are set on a nonporous microwavable surface or tray, which is then placed in a microwave oven. The oven is then turned on so that microwave energy is applied to the pieces of cheese until their moisture level has been reduced to a final moisture content of between about 2% and about 8% by weight. A more preferred range for the final moisture content is from about 2% to about 4% by weight.

In actual practice, especially using lower power or capacity microwave units such as are used for home or institutional food preparation, the microwave drying step can be practiced in two, three, or more substeps. After each substep, it has been found helpful to vent briefly the microwave heating unit to release entrained moisture. In commercial practice or using microwave equipment designed for rapid removal of moisture from the material being processed, such venting is less desired. The period of venting, however, should be only sufficient to, accomplish the venting and not be allowed to continue so long as to allow the intermediately dried product to cool to room temperature.

Various seasoning materials can be applied to the dried cheese pieces. Application immediately after the drying process as compared to either pre-drying or post-cooling application of the seasonings, particularly those seasonings in dry particulate form, adhere to the cheese pieces especially well. It is believed that liquid fat created during the microwave heating and drying step entrains the seasoning material. Such a phenomenon not only improves the physical adherence of the seasoning material but also, surprisingly, greatly increases the flavor impact of the seasoning. At conventional seasoning usage levels, the flavor impact is enhanced. If desired, however, the usage of costly seasoning materials can be reduced and yet obtain finished products exhibiting comparable flavor levels to that obtained with either pre-drying or post-cooling application at higher seasoning usage levels.

Figures 1, 2:
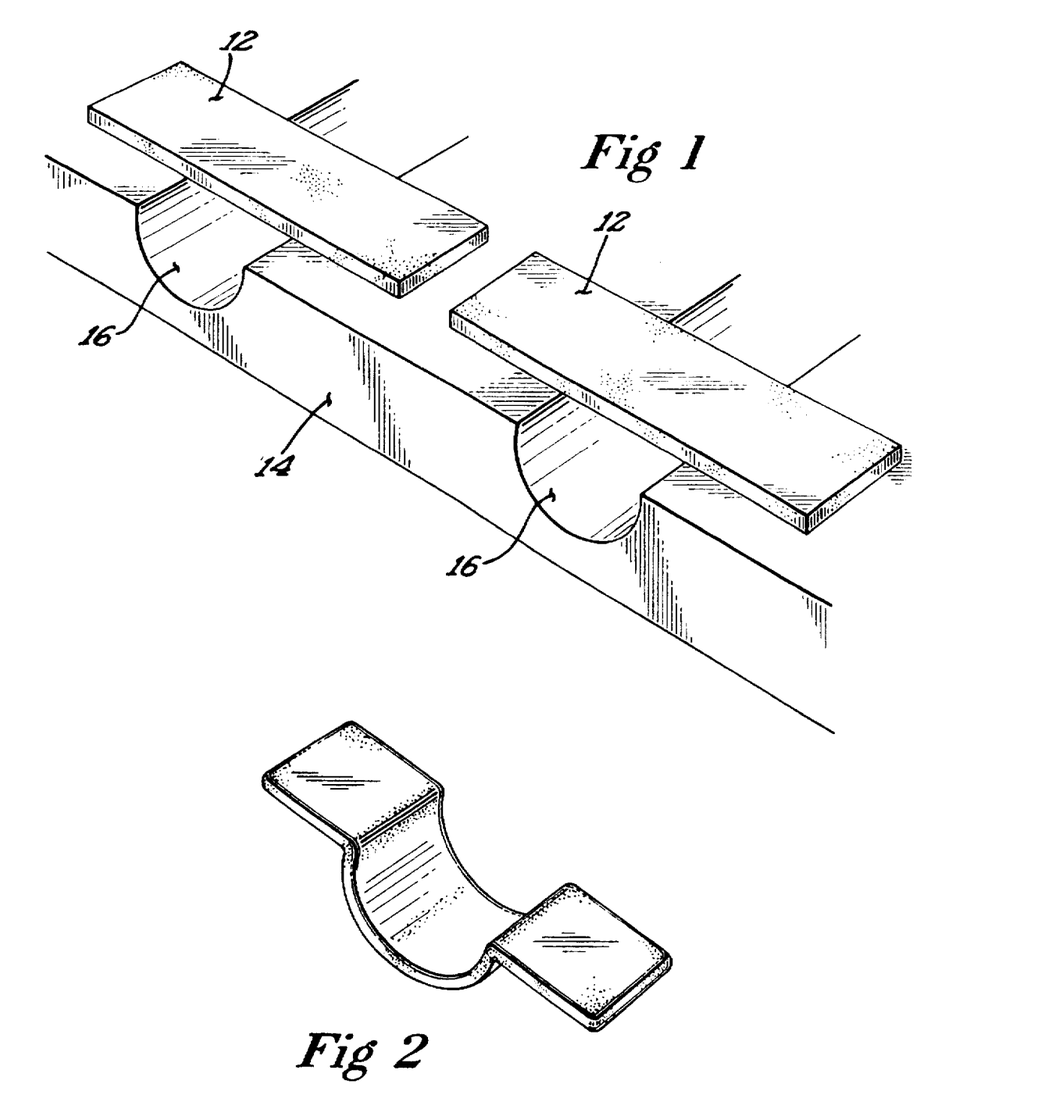
FIG. 1 is a perspective view of a forming pan used to prepare a finished product having the omega shape depicted in FIG. 2.
FIG. 2 is a perspective view of a shaped finished product dried cheese piece of the present invention having a preferred "omega" shape.

In another embodiment, the present invention contemplates the forming of finished cheese pieces importantly defined by having a particular three dimensional shape or configuration. In these embodiments, it is further important that the cheese starting material additionally be essentially characterized as being thermoplastic. Referring now briefly to FIG. 1, in this embodiment, one or more cheese slices 12 can be draped over a particularly shaped forming pan or mold 14 such as depicted in FIG. 1. The forming pan or mold 14 has one or more cavities or mold portions shaped in the negative image of the desired final product shape such as the inverted U shaped channels 16 depicted, with channel 16 having a depth of ¾ inch (1.9 cm) and a with of ⅞ inch (2.2 cm) in the preferred form. During the drying process and by virtue of their thermoplastic and dimensional or thickness features, the cheese slices deform and assume the outline or profile of the forming mold or pan such as by gravity. After completion of the drying process and cooling, the finished dried cheese products retain their assumed shape. In particular, finished pieces having the omega shape depicted in FIG. 2 are found to be particularly desirable. Of course, other techniques for creating the desired shape can be employed, e.g., draping a portion over a positive image such as a cylindrical mold in the case of the preferred omega shape.

The finished cheese slice pieces preferably are unblemished and clear in color, e.g., white. However, the finished products can also have a slightly mottled color yet be acceptable to consumers. This appearance of brown freckles is produced by the caramelizing of the lactose in the cheese. Such mottled appearance feature is preferably minimized.

While microwave drying is the preferred method for finish drying the present nonmelting cheese slices, any form of dielectric heating can also be employed. Dielectric heating, or equivalently in the art "high frequency" heating is used in its conventional sense (see, for example, "Industrial Microwave Heating," A C. Metaxas and R. J. Meredith, 1983, pg. 2) to include both portions of the microwave (10 GHz to 300 MHz) and the radio (300 to 3 Mhz) frequency ranges. Of course, the above description does not include the much higher frequencies of infrared radiation. Infrared radiation has been found not to be useful herein since the heat effect is only upon the surface of the cheese slice rather than within the slice itself. That is, the internal moisture takes too long to dry to be practical or is insufficiently dried in the length of time possible with higher frequency heating.

The dielectric heating, e.g., microwave, or drying step is preferably practiced at atmospheric pressure. At reduced pressures, the cheese slice can tend to vaporize the internal moisture too quickly causing the product to undesirably puff or otherwise deform.

Since puffing of the slices is undesirable, the cheese starting material is desirably free of any leavening or gas producing ingredients. The finished products are essentially further characterized as being substantially unpuffed. "Unpuffed" herein is meant that the finished product rises less than about 20% from its predrying dimension.

The finished product is further desirably as being unpocked. A pocked or "lacy" product is one if on its flat surface it has many holes that are large enough and/or covered with a sufficiently thin film of cheese so that one can either see through the holes or the holes are translucent under normal lighting conditions. By "many" is meant at least on average of one visible hole per square centimeter,

EXAMPLE 1

This example sets out the manufacturing steps for making a new and unique natural cheese that does not melt, and the steps for slicing and microwave drying the nonmelting cheese.

Milk with the following composition is selected; water (87.2%); fat (3.9%); casein (2.5%); albumen (0.7%); milk sugars (5.0%); and ash (0.7%).

The milk is then pasteurized for 30 seconds at 183°–184° F. (83.8°–84.4° C. ) in a High Temperature Short Time Pasteurizer to incorporate denatured whey proteins into the final cheese product. These denatured whey proteins help the final cheese product resist melting. Using a metering injection pump, phosphoric acid is injected into the raw milk line leading to the regeneration section. The milk is acidified to a pH of 6.25–6.35 as the milk enters the vat.

The ingredients for the cheese make procedure are as follows: the pasteurized milk; rennet (microbial rennet with sodium chloride and sodium benzoate as preservative agents) in an amount of three ounces (85 gm) per one thousand pounds (454.5 kg) of milk; and calcium chloride in an amount of two to six ounces (57–170 gm) per one thousand pounds (454.5 kg) of milk. The rennet is diluted with forty volumes of cold, chlorine-free water before being mixed with the pasteurized milk. The calcium chloride is also diluted with forty volumes of cold chlorine-free water before being mixed with the pasteurized milk. It should be noted that calcium chloride meets the specifications of food chemical codes.

The cheese make procedure is as follows:

a. Set temperature (91°–93° F. (32.8°–33.9° C. )).
b. Set time (25–35 minutes).
c. Curd knife size (about ⅜ inch (9 mm) cut).
d. Heal time (8–10 minutes).
e. pH at cut (6.25–6.35).
f. After the cut, the cheese curds and whey are gently agitated for five minutes.
g. The curds and whey are then heated to 110°–112° F. (43.3°–44.4° C. ) for 30 to 35 minutes.
h. The agitation speed is then increased slightly (5–10%) and the heat is turned off. The agitation of the curds and whey is continued for 5–10 minutes.
i. The agitator is stopped, and 50% of the volume of whey is drained off.
j. The remaining curds and whey are agitated for 15 to 20 minutes.
k. The remaining whey is drained. l. After all the whey has been drained, flake salt is added to the curd in the amount of 2–8% of the curd weight. The curd is agitated while the salt is being added.
m. While the salt is being added (or optionally after the salt has been added), herb and garlic seasoning can be added (or optionally other flavorings can be added).
n. When all the salt has been dissolved, the cheese curds are placed in hoops for pressing.
o. The cheese curds are then pressed at 25–35 pounds (11.4–15.9 kg) of pressure for 10 hours or longer such that the finished cheese includes a pH of 6.1 to 6.25 and a moisture content of between 39% and 41% by weight.

The cheese is then sliced into thin pieces of less than ¼ inch (0.64 cm) in thickness.

The cheese has a melt value of less than 1.2.

Three to four ounces (85–113 gm) of the sliced cheese are placed in a microwave oven at 700 watts (as measured by the 2-liter method) for three to eight minutes or until the final product moisture has been reduced to less than 5% by weight.

The dried cheese pieces are allowed to cool, and packaged for sale.

Now that the basic process for making the nonmelting dried cheese piece has been explained, certain features and advantages of the invention can be set forth and appreciated. For example, the form of the present dried cheese piece is advantageous. The dried cheese piece is crisp, yet not brittle. It is thin, but remains essentially in one piece throughout shipment. It is sufficiently thick to remain intact so as to not fall apart, but is easy to chew.

The feature of microwaving the nonmelting cheese is advantageous because this form of heat readily heats the cheese and thus readily drives moisture out of the cheese. Further, microwaving heats the cheese from the inside. Accordingly, some of the hard-to-reach moisture remaining in an already dried cheese is efficiently driven out with microwave energy. Microwaving further avoids forming a moisture-retaining crust.

Moreover, the present invention solves the problem of heating the cheese for sufficiently long periods that its moisture is lost without creating many large holes that would allow fat loss.

The present invention Further solves the problem of drying the cheese without caramelizing significant amounts of milk sugar nor developing a burnt flavor.

The feature of using a nonmelting cheese is advantageous because it permits the use of a reasonable amount of energy in the drying step. For example, with the preferred microwave drying of the cheese, a reasonable amount of microwave energy may be used without burning the cheese. As compared to other cheeses, a nonmelting cheese also better retains its shape after being dried. The use of a nonmelting cheese also minimizes the chance that a moisture retaining crust will be formed.

The use of a cheese with a relatively low initial moisture content is advantageous because it permits one to minimize the amount of heat required to dry the cheese to the desired final moisture content. A cheese with a relatively high moisture content may acquire a burnt taste if dried by microwaves or require an excessively long time to be dried if dried by other means.

The process of making the nonmelting dried cheese piece is economical. It does not require the expense of a freeze drying operation. Furthermore, the process is substantially more rapid than processes that involve the addition of water and its subsequent drying in a thin layer.

Additionally, the present invention balances having too much fat in the cheese (causing the cheese to melt), having too much water in the cheese (causing the cheese to acquire a burned flavor before the cheese is dried to its desired level), having too little fat (a flavor and cost disadvantage), and having too little water (an unnecessary cost element in the cheese making operation) which can make the cheese crumbly, cracked or have mechanical openings, or difficult to slice. These defects cause the dried cheese piece to have large openings and to be structurally weak or otherwise unacceptable.

Another advantage is that the end product may be immediately eaten or shipped for later consumption. The end product is not useful merely as an ingredient in other food products, nor is such use intended.

Another advantageous feature of the invention is that flavorings, colorings, inlays, vitamins, and minerals are not required; nor are preservatives. Even where ingredients and additives are included in the dried cheese piece, the dried cheese piece still consists of over 95% cheese.

Nonmelting cheeses are an unusual class of cheese because consumers typically prefer easily meltable cheeses. It is believed that nonmelting cheeses consist of less than 5% of the cheese market. People generally prefer smooth and creamy cheese, attributes not found in nonmelting cheese.

The end product of the present invention may be referred to generally as a cheese snack. More specifically, the finished product is, in the preferred embodiment, in the form of formed slices of dried cheese. Other cheese products which may be produced by the present invention include crushed breading such as to be used over baked meats, croutons, stuffing, and small bits to be used as seasonings.

It should be noted that although nonmelting cheeses with an initial moisture content of no greater than about 46% are preferred (because it is possible to microwave dry these cheeses from 46% to less than 8% without burning the cheese), it is within the scope of this invention to take a nonmelting cheese with a higher initial moisture content and dry such a cheese, or a slice of the cheese, to about 46% or less such as to about 20%, whereupon the cheese or cheese slice is microwaved to reduce the moisture content still further.

It is further desireable that the cheese slices prior to microwave drying be substantially free of cracks, crevices, or openings, even pin hole sized, whether internal or external. Such structural imperfections can lead to undesirable formation of large voids upon microwave heating.

The finished product is also importantly characterized by having a uniform structure and texture. Thus, the finished product is importantly characterized as not having a crust feature, i.e., without a dry cruet feature. A crust feature, it is believed, is formed when one or both of the following conditions exist. First, a crust can form when the moisture content at the surface is lower than in the interior of the product. Second, a crust can form when the surface is devoid of, or deficient in, minuscule air pockets. The lack of such tiny air pockets or pores in the surface gives the crust an undesirable hard, brittle texture rather than the desired crunchy texture.

The finished product is further defined by being undeformed. By undeformed herein it is meant in part that the ratio of final thickness prior to drying to final thickness after drying ranges from about 0.9–1.1; 1. Also, if the initial cheese piece was sliced to have a uniform thickness, then the final dried cheese piece will retain a substantially uniform thickness. If the initial cheese piece is sliced so as to have straight squared off edges, the finished pieces will retain the straight squared off edges feature after drying.

The finished product exhibit sufficient mechanical strength to maintain the pieces in the form of unbroken slices of a size and shape characteristic of the cheese slices from which they are prepared. The slices are breakage resistant and endure routine handling associated with packaging and distribution without forming excessive amounts of either broken pieces or fines.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A dried cheese product useful as a shelf stable snack product, comprising:
    a crisp unpuffed dried cheese piece without a dry crust fabricated from a slice of a nonmelting cheese having been dried to a final moisture content of about 2% to 8%.

2. The dried cheese product of claim 1 having been at least partially dried by atmospheric microwave or radio frequency heating.

3. The dried cheese product of claim 2 having a thickness of between about 1/32 inch (0.64 cm) and about 1/4 inch (6 mm).

4. The dried cheese product of claim 3 wherein the slice has an opposed pair of major surfaces ranging in size of up to about 25 square inches (161 cm$^2$).

5. The dried cheese product of claim 4 wherein the major surfaces range in size as large as having a surface area of about 25 square inches (161 cm$^2$) and as small as 1/4 inch (0.64 cm) in at least one direction.

6. The dried cheese product of claim 5 wherein the nonmelting cheese is a natural cheese having a pH of greater than about 5.7.

7. The dried cheese product of claim 6 wherein the nonmelting cheese is a processed cheese having a dry cheese solids content and having a melt inhibiting inorganic phosphate salt selected from the group consisting of tetrasodium pyrophosphate, sodium acid Pyrophosphate, sodium hexametaphosphate, and mixtures thereof present in an amount of between about 0.5% to 3% by weight based on the amount of dry cheese solids content.

8. A. The dried cheese product of claim 5 wherein the non-melting cheese has a melt value of less than 1.2.

9. The dried cheese product of claim 8 free from external cracks.

10. The dried cheese product of claim 9 wherein the straight side edge has a vertical edge face that is perpendicular to the upper and lower major faces.

11. The dried cheese product of claim 8 wherein the piece is unpocked.

12. The dried cheese product of claim 8 wherein the piece is free of interior cracks.

13. The dried cheese product of claim 8 wherein the piece has an omega shape.

14. A process for making dried crisp cheese pieces requiring no refrigeration, comprising the steps of:
    A. providing slices of nonmelting cheese having an initial moisture content ranging from about 30% to 46% by weight and an initial thickness; and
    B. drying the slices to a final moisture content of about 2% to 8% without puffing the slices to form dried crisp unpuffed cheese pieces without a dry crust and having a finished thickness,
    wherein at least a final portion of the drying is performed using atmospheric microwave or radio frequency heating.

15. The process of claim 14 wherein the slices each have a finished thickness of between about 1/32 inch (0.64 cm) and about 1/4 inch (6 mm).

16. The product prepared by the process of claim 14.

17. The process of claim 14 wherein the cheese has a melt value ranging from 1.0 to 1.1.

18. The process of claim 14 wherein the slice has a ratio of final thickness to initial thickness of about 0.9:1 to about 1.1:1.

19. The process of claim 14 wherein in step A the slice is pressed to have an initial moisture content ranging from about 36% to 43% and without creating internal and external cracks and without creating a crumbly cheese that will not slice smoothly.

20. The process of claim 14 further comprising the step of applying a topical coating immediately after the atmospheric microwave or radio frequency heating step and while the slices are still warmer than room temperature.

21. The process of claim 14 wherein the slices are free of external cracks.

22. The process of claim 14 wherein the slices are free of internal cracks.

23. The process of claim 14 wherein the nonmelting cheese has about 10% of its whey protein denatured.

24. The process of claim 14 further comprising the step of draping the slices of nonmelting cheese over mold portions having a final product shape during the drying step so that the slices of nonmelting cheese assume the final product shape, with the final product shape having upper and lower major surfaces connected by at least one straight square edge.

25. The process of claim 24 wherein the draping step comprises the step of draping the slices of nonmelting cheese over the mold portions of a negative image of the final product shape, with the slices of nonmelting cheese deforming and assuming the profile of the negative image by gravity.

26. The process of claim 25 wherein the draping step comprises the step of draping the slices of nonmelting cheese over an inverted channel.

27. The product prepared by the process of claim 26.

28. The process of claim 24 wherein the major surfaces range in size as large as having a surface area of about 25 square inches (161 cm$^2$) and as small as ¼ inch (0.64 cm) in at least one direction.

29. The process of claim 28 wherein the drying step includes substeps of drying the slices with microwave drying from the initial moisture content to an intermediate moisture content of about 10% to 25% and venting to release entrained moisture after each substep.

30. The process of claim 29 wherein the nonmelting cheese is a natural cheese having a pH of greater than about 5.7.

31. The process of claim 30 wherein the nonmelting cheese includes about 0.5% to 3% by weight an inorganic melt inhibiting polyphosphate.

32. The process of claim 31 wherein the nonmelting cheese prior to drying includes is a processed cheese having a dry cheese solids content and having a melt inhibiting inorganic phosphate salt selected from the group consisting of tetrasodium pyrophosphate, sodium acid pyrophosphate, sodium hexametaphosphate, and mixtures thereof present in an amount of between about 0.5% to 3% by weight based upon the amount of dry cheese solids content.

33. The process of claim 32 wherein all the drying step is practiced using atmospheric microwave or radio frequency heating.

34. The process of claim 33 wherein the nonmelting cheese is a natural cheese having a pH of greater than about 5.7.

35. The process of claim 34 wherein the nonmelting cheese includes about 0.5% to 3% by weight an inorganic melt inhibiting polyphosphate.

36. A process for making a dried crisp cheese piece comprising the steps of:

A. providing slices of nonmelting cheese having an initial moisture content and an initial thickness;

B. draping the slices of cheese over mold portions having a final product shape;

C. drying the slices while the slices are draped over the mold portions so that the slices of cheese assume the final product shape and to a final moisture content which retains the final product shape after cooling; and D. packaging the dried slices of the final product shape.

37. The process of claim 36 wherein the draping step comprises the step of draping the slices of nonmelting cheese over the mold portions of a negative image of the final product shape, with the slices of nonmelting cheese deforming and assuming the profile of the negative image by gravity.

38. The process of claim 37 wherein the draping step comprises the step of draping the slices of nonmelting cheese over an inverted channel.

39. A dried cheese product useful as a shelf stable snack product, comprising a cheese piece fabricated from a slice of nonmelting cheese and having upper and lower major surfaces connected by at least one straight square edge and having a three-dimensional shape and dried to a final moisture content which retains the final product shape without requiring refrigeration.

40. The dried cheese product of claim 39 wherein the final product shape is an omega shape.

* * * * *

UNITED STATES PATENT AND TRADEMARK OFFICE
CERTIFICATE OF CORRECTION

PATENT NO. : 5,795,613
DATED : August 18, 1998
INVENTOR(S) : Paul Scharfman et al.

It is certified that error appears in the above-identified patent and that said Letters Patent is hereby corrected as shown below:

Cover Page, item [75], cancel "Scharfmann" and substitute --Scharfman--.

Cover Page, item [56], cancel "2,572,765" and substitute --2,571,765--.

Column 1, lines 7 and 8, cancel ", now abandoned".

Column 1, line 9, after "1995" insert --, now abandoned--.

Column 3, line 34, cancel "times-may" and substitute --times may--.

Column 3, line 66, cancel "selecting" and substitute --Selecting--.

Column 4, line 40, cancel "commuted" and substitute --comminuted--.

Column 4, line 48, cancel "with-desired" and substitute --with desired--.

Column 6, line 13, cancel "ot" and substitute --of--.

Column 8, line 46, cancel ";" and substitute --:--.

Column 9, line 22, after "drained." start new paragraph.

Column 9, line 65, cancel "Further" and substitute --further--.

Column 10, line 3, cancel "step," and substitute --step.--.

UNITED STATES PATENT AND TRADEMARK OFFICE
CERTIFICATE OF CORRECTION

PATENT NO. : 5,795,613

DATED : August 18, 1998

INVENTOR(S) : Paul Scharfmann et al.

It is certified that error appears in the above-identified patent and that said Letters Patent is hereby corrected as shown below:

Column 10, line 8, cancel "moisture retaining" and substitute --moisture-retaining--.

Column 10, line 49, cancel "cheese," and substitute --cheese.--.

Column 11, line 4, cancel "cruet" and substitute --crust--.

Column 11, line 16, cancel ";" and substitute --:--.

Column 11, lines 52-54, cancel "slice..." to and including "...(161 $cm^2$)" and substitute --slices each have upper and lower major surfaces connected by at least one straight square edge--.

Column 11, line 66, cancel "Pyrophosphate" and substitute therefor --pyrophosphate--.

Column 12, line 3, cancel "A.".

Column 13, line 18, cancel "includes".

Signed and Sealed this

Seventeenth Day of November, 1998

Attest:

BRUCE LEHMAN

*Attesting Officer*    *Commissioner of Patents and Trademarks*